March 29, 1927.
F. POLLIFRONE
LAWN MOWER
Filed Nov. 4, 1924
1,622,923
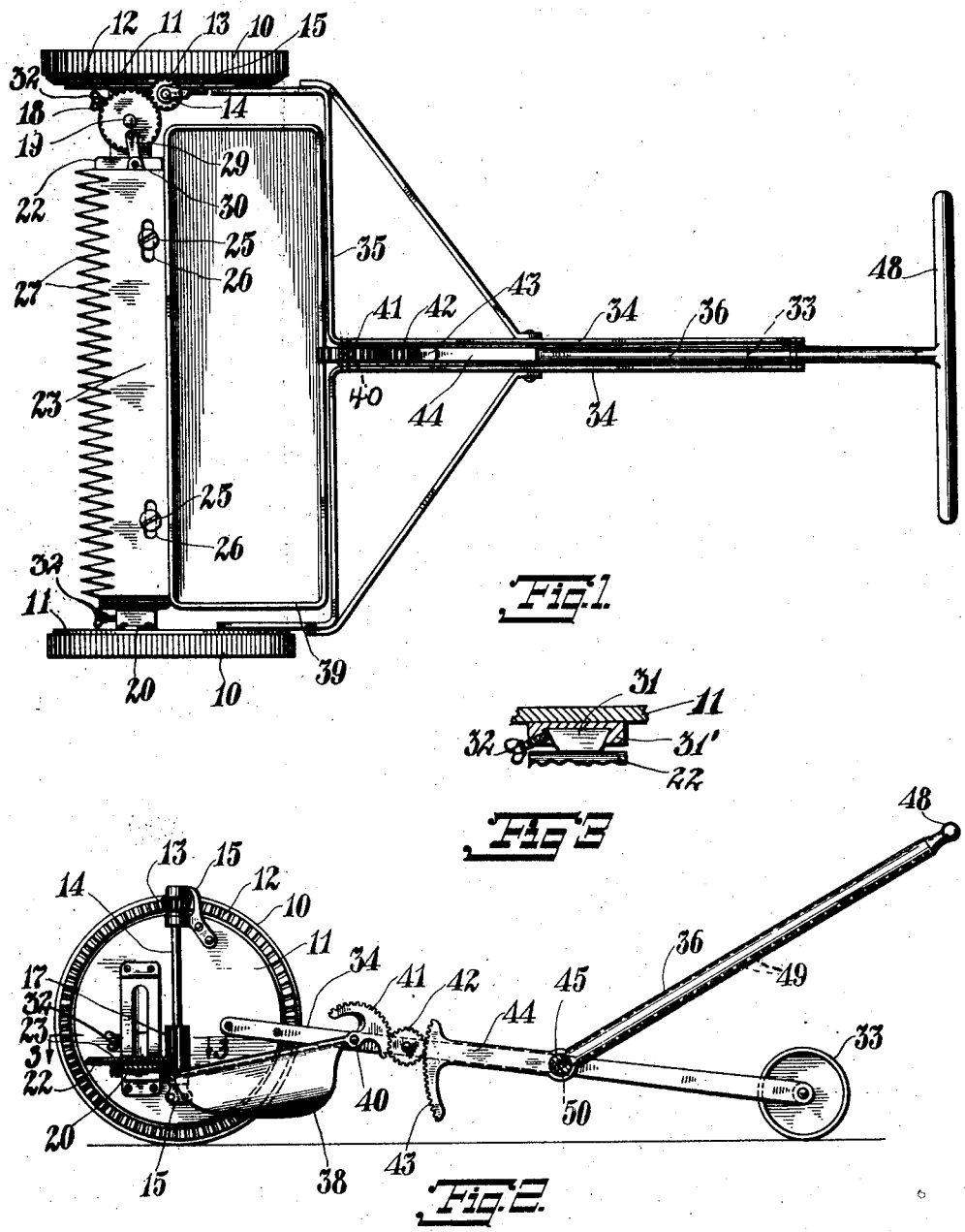
INVENTOR
Frank Pollifrone
BY
ATTORNEY Patented Mar. 29, 1927.

1,622,923

UNITED STATES PATENT OFFICE.

FRANK POLLIFRONE, OF BROOKLYN, NEW YORK.

LAWN MOWER.

Application filed November 4, 1924. Serial No. 747,740.

This invention relates generally to grass cutting machines, being intended more particularly for embodiment in the type of manually operable machines commonly known as a lawn mower.

The invention has for an object to provide a novel machine of this type having a reciprocating cutting element, a further object relating to the provision of a receptacle to receive the grass, which receptacle is mounted in a novel manner to facilitate dumping thereof.

For further comprehension of the invention, and of the objects and advantages thereof, reference will be had to the following description and accompanying drawing, and to the appended claims in which the various novel features of the invention are more particularly set forth.

Fig. 1 of the drawing is a plan view of my improved lawn mower. Fig. 2 is a central longitudinal sectional view thereof.

Fig. 3 is a fragmentary horizontal sectional view taken on the line 3—3 of Fig. 2.

Referring now to the drawing the reference numeral 10 indicates a pair of wheels that are mounted in the manner common with lawn mowers, on a pair of disks 11, to rotate on said disks. One of the wheels 10 is formed with bevel gear teeth 12 that are engaged by a pinion 13 on the upper end of a vertical shaft 14 that is supported by brackets such as 15 fixed to the adjacent disk. On the lower end of this shaft 14 is a spur pinion 17 which meshes with a spur gear 18 on a stub shaft 19 that is mounted on a crosspiece 20 extending between the two disks 11 and fixed at its ends to the latter. This crosspiece serves as a brace for the disks as well as a support for the gear 18 and for the cutting element.

The cutting device of my improved lawn mower comprises a pair of transversely extending cutter bars or blades consisting of a stationary blade 22, and a movable blade 23 that is slidable on the stationary blade. The movable blade is guided upon the stationary blade by suitable means such as the headed screws 25 that are fixed in the stationary blade and pass through longitudinal slots 26 in the movable blade. These blades are provided at their forward edges with cutter teeth 27. The movable blade 23 is operatively connected with the spur gear 18 to be reciprocated by the latter the connection being here shown as effected by means of a link 29 connected at one end to the gear 18, eccentrically of the latter and at its opposite end to a lug 30 projecting from the end of the said movable blade. The cutting device is preferably arranged for vertical adjustment and to this end the stationary blade 22 is formed at its ends with dovetail lugs 31 engaging in guides such as 31' on the disks 11, set screws 32 holding the lugs in set position. The pinion 17 is elongated to accommodate the different positions of the gear 18.

The machine is adapted to be retained with the blades in horizontal disposition, longitudinally of the machine by means of a wheel 33 that is supported in the rear end of a frame element consisting of a pair of parallel bars 34 that extend rearwardly from the cutting head of the machine, their front ends being turned as shown at 35 and being fixed to the disks 11. This frame also supports a handle 36 for guiding the machine and a receptacle for the grass that is cut. This receptacle is in the form of a bag 38 that is suspended from a rectangular frame 39 behind the cutting blades. This element 39 is pivotally attached as at 40 between the bars 34 and has an integral rearwardly extending gear element 41 fixed thereon. This segment meshes with an idler 42 mounted between the bars 34 this idler in turn meshing with a gear segment 43 on the free front end of an arm 44 that is pivoted at its rear end on a pintle 45 fixed to and between the bars 34, the radius of the segment 43 being greater than that of the segment 41. Fixed to the arm 44 and extending rearwardly and upwardly is the guiding handle 36 of the machine that is provided with a crossbar 48 at its upper end. This crossbar is fixed on the upper end of a rod 49 that extends freely through the hollow handle and has a screw threaded tip 50 on its lower end that engages in a threaded aperture in the pintle 45 thereby holding the handle rigid, and also acting to retain the receptacle 38 in place.

It is believed that the manner of operation and use of my improved lawn mower will be readily understood from the above description, it being apparent that when the machine is rolled along the ground the blade 23 will be caused to reciprocate, and cut the grass in conjunction with the blade 22. To dump the receptacle the crossbar 48 is turned to free the tip 50 from the pintle 45 when, by bearing downward on the rear end of the handle 36, the receptacle is swung upward and backward to discharge its contents.

I claim—

1. In a lawn mower, the combination of means whereby the cut grass collector receptacle may be dumped, comprising a receptacle having an integral rearwardly extending gear element, an idler gear meshing with former gear element, a gear segment on the front end of an arm that is pivoted at its rear on a pintle, a guiding handle extending rearwardly and upwardly from said arm, and a cross bar at the upper end of said handle.

2. In a lawn mower, the combination of means whereby the cut grass collector receptacle may be dumped, comprising a receptacle embodying a bag suspended from a rectangular frame, a rearwardly extending gear element depending from said frame, an idler gear meshing with former gear element, a gear segment on the front end of an arm that is pivoted at its rear on a pintle, a guiding handle extending rearwardly and upwardly from said arm, and a cross bar at the upper end of said handle.

In testimony whereof I have affixed my signature.

FRANK POLLIFRONE.